Oct. 29, 1929. E. B. P. CRUMP Re. 17,472

HANDKERCHIEF VANITY AND POWDER PUFF HOLDER

Original Filed Nov. 5, 1925 2 Sheets-Sheet 1

E. B. P. Crump
Inventor

By C. A. Snow & Co.
Attorneys

Oct. 29, 1929. E. B. P. CRUMP Re. 17,472

HANDKERCHIEF VANITY AND POWDER PUFF HOLDER

Original Filed Nov. 5, 1925 2 Sheets-Sheet 2

E.B.P.Crump
Inventor

By C. A. Snow & Co.
Attorneys

Reissued Oct. 29, 1929

Re. 17,472

UNITED STATES PATENT OFFICE

ELLEN B. PHELPS CRUMP, OF NITTA YUMA, MISSISSIPPI

HANDKERCHIEF VANITY AND POWDER-PUFF HOLDER

Original No. 1,652,611, dated December 13, 1927, Serial No. 67,155, filed November 5, 1925. Application for reissue filed May 16, 1928. Serial No. 278,262.

This invention aims to provide a novel means whereby a powder puff can be carried in a pocket handkerchief, the construction of the handkerchief and the puff being such that both of them may be folded up into small compass, so as to occupy practically no more space than is occupied by an ordinary pocket handkerchief, the use of a thick and cumbersome powder puff being unnecessary.

It is within the province of the disclosure to improve generally and to enhance the utility of devices of that sort to which the invention appertains.

Although a preferred form has been shown, a maker of pocket handkerchiefs, working within the scope of what is claimed, may make many changes in the forms shown, without in anywise departing from the spirit of the invention, it being impossible to show all of the forms which the invention may take, and the forms depicted being typical and illustrative merely.

In the drawings:—

Figure 1:
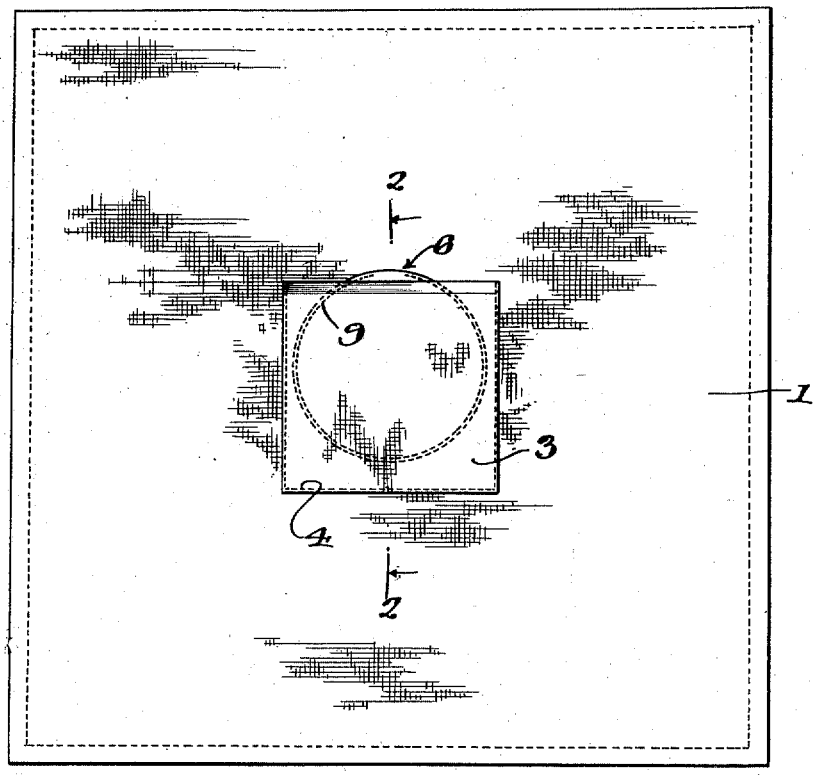
Figure 1 shows in plan, a device constructed in accordance with the invention, the powder carrier being pulled out of the pocket a little.
Figure 2:
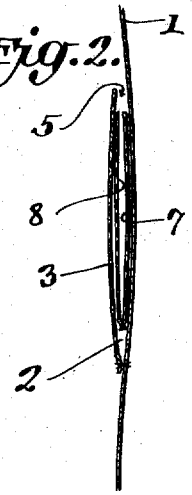
Figure 2 is a section on the line 2—2 of Figure 1.
Figure 3:
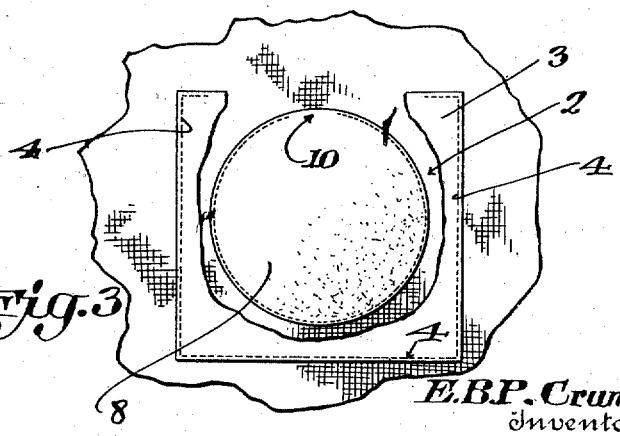
Figure 3 is a plan wherein parts are broken away, the powder carrier being in the pocket.

In carrying out the invention as disclosed in Figures 1, 2 and 3, there is provided a handkerchief 1 made out of any material of the kind from which such articles generally are made, the handkerchief having a pocket 2 which may be fashioned as preferred. The pocket 2 may be formed by a layer 3 stitched at 4, or secured otherwise, to the handkerchief 1, about a portion of its periphery, leaving an opening 5. The layer 3 may be made of the same material as that out of which the handkerchief 1 is manufactured, but this detail is not insisted upon, it being necessary, merely, that the layer 3, which forms the pocket 2, be thin and highly flexible, so as to take up little additional room along with the handkerchief 1.

Into the pocket 2 may be inserted a powder carrier 6 of any desired sort. Preferably the powder carrier 6 is of circular outline, the layer 3 which forms the pocket 2 being of rectangular outline, but this need not be so. The powder carrier 6 is made up of two pieces or sheets 7 and 8, the sheet 7 being of rubber or other impervious material, so that the powder cannot sift therethrough, and the layer 8 being of porous material and of textile nature, generally, so that the powder can find its way through the layer 8. The constituent parts 7 and 8 of the powder carrier 6 are secured together by stitching or otherwise, as indicated at 9, leaving an opening 10, into which a pinch or two of powder may be inserted.

The carrier 6 may be introduced readily into the pocket 2 of the handkerchief 1, and the entire article when folded up, will occupy but little more space than an ordinary pocket handkerchief, the disadvantages incident to thick powder puffs, heavy powder puff cases, and the like being avoided.

Figure 4:
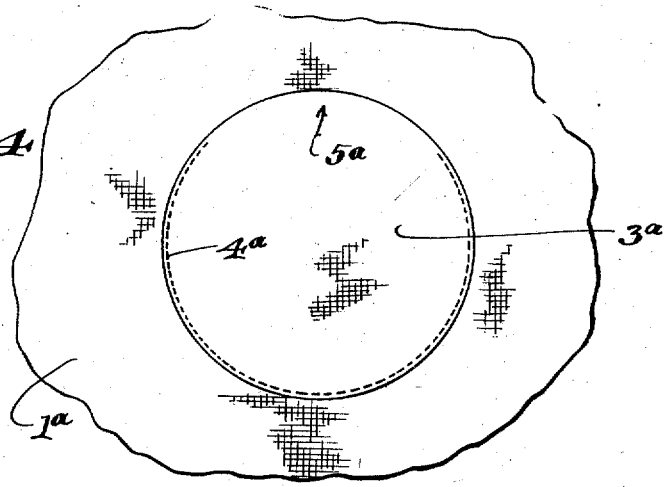
Figure 4 is a plan showing a modification.

In Figure 4 of the drawings, parts hereinbefore described have been designated by numerals previously used, with the suffix "a". The modification consists in making the patch-forming layer 3 of circular outline, rather than of rectangular outline, as depicted in Figures 1 and 3.

Figure 5:
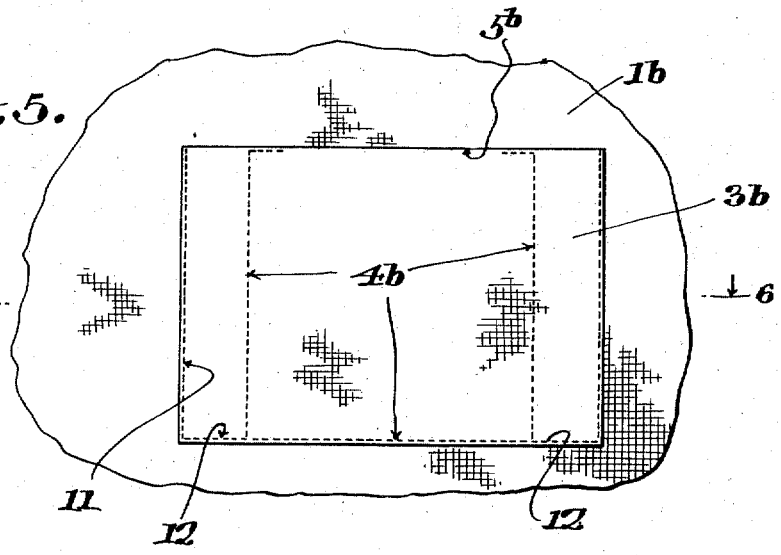
Figure 5 is a plan showing another modification.
Figure 6:
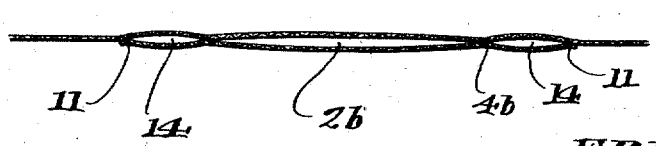
Figure 6 is a section on the line 6—6 of Figure 5.

Passing to the modification shown in Figures 5 and 6, parts hereinbefore described have been designated by numerals previously used, with the suffix "b." The layer 3 is secured along its sides, as at 11, and along its lower end, as at 12, to the handkerchief $1^b$, thereby forming side pockets 14, into which lip-sticks and other articles may be inserted.

Although it has been pointed out hereinbefore that the handkerchief and its pocket are adapted to carry a powder-holder, it will be understood that articles of any desired kind may be mounted in the pocket.

The handkerchief may be rectangular and square, oblong, or of any other desired shape that the manufacturer or the user may wish.

Having thus described the invention, what is claimed is:—

1. In a device of the class described, a handkerchief, a patch of material of small area compared to the area of the handkerchief, the patch being disposed at the center of the handkerchief and being permanently connected to the handkerchief throughout more than one-half the periphery of the patch to form a pocket and an opening for the pocket, and a powder holder in the pocket and removable through the opening, the powder holder being formed of layers secured together to leave an opening, the layers and the patch being fashioned from material which approaches the constituent material of the handkerchief in flexibility and thickness, one layer of the powder holder being formed from an impervious material to prevent the powder from sifting outwardly through the handkerchief when the corners of the handkerchief are folded together over the patch.

2. In a device of the class described, a handkerchief, a patch of material of small area compared to the area of the handkerchief, the patch being disposed at the center of the handkerchief and being permanently stitched to the handkerchief throughout more than one-half the periphery of the patch to form a pocket and an opening for the pocket, and a powder holder in the pocket and removable through the opening, the powder holder being formed of layers secured together to leave an opening, the layers and the patch being fashioned from material which approaches the constituent material of the handkerchief in flexibility and thickness, one layer of the powder holder being formed from an impervious material to prevent the powder from sifting outwardly through the handkerchief when the corners of the handkerchief are folded together over the patch.

3. In a device of the class described, a handkerchief, a patch of material of less area than the area of the handkerchief, the patch being disposed at the center of the handkerchief and being permanently connected to the handkerchief throughout more than one-half the periphery of the patch to form a pocket and an opening for the pocket, and a powder holder in the pocket and removable through the opening, the powder holder being formed of layers secured together to leave an opening, the layers and the patch being fashioned from material which approaches the constituent material of the handkerchief in flexibility and thickness, one layer of the powder holder being formed from an impervious material to prevent the powder from sifting outwardly through the handkerchief when the corners of the handkerchief are folded together over the patch.

In testimony that I claim the foregoing as my own, I have hereto affixed my signature.

ELLEN B. PHELPS CRUMP.